(12) United States Patent
Pamu et al.

(10) Patent No.: US 12,418,478 B2
(45) Date of Patent: Sep. 16, 2025

(54) INTERCONNECT NETWORK FOR MULTI-TILE SYSTEM ON CHIPS

(71) Applicant: Intel Corporation, Santa Clara, CA (US)

(72) Inventors: Abhishek Reddy Pamu, El Dorado Hills, CA (US); Lakshminarayana Pappu, Folsom, CA (US); David J. Harriman, Portland, OR (US); Ramadass Nagarajan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 17/561,121

(22) Filed: Dec. 23, 2021

(65) Prior Publication Data

US 2022/0116322 A1  Apr. 14, 2022

(51) Int. Cl.
*H04L 45/00* (2022.01)
*G06F 15/78* (2006.01)

(52) U.S. Cl.
CPC ......... *H04L 45/54* (2013.01); *G06F 15/7825* (2013.01); *H04L 45/72* (2013.01)

(58) Field of Classification Search
None
See application file for complete search history.

(56) References Cited

U.S. PATENT DOCUMENTS

| 12,217,327 | B2* | 2/2025 | Mrozek | G06F 12/0875 |
| 2007/0204245 | A1* | 8/2007 | Fotakis | G06F 30/367 |
| | | | | 716/115 |
| 2008/0285562 | A1* | 11/2008 | Scott | H04L 45/745 |
| | | | | 370/392 |
| 2010/0002660 | A1* | 1/2010 | Grayson | H04W 4/20 |
| | | | | 370/338 |
| 2016/0192157 | A1* | 6/2016 | Wirola | H04W 4/029 |
| | | | | 455/456.1 |
| 2018/0176118 | A1* | 6/2018 | Adler | H04L 12/462 |
| 2019/0042240 | A1 | 2/2019 | Pappu et al. | |
| 2019/0042487 | A1 | 2/2019 | Pappu et al. | |
| 2019/0303334 | A1* | 10/2019 | White | G06F 13/4027 |
| 2022/0225079 | A1* | 7/2022 | Balakrishnan | H04W 8/186 |

* cited by examiner

*Primary Examiner* — Xavier S Wong
(74) *Attorney, Agent, or Firm* — Nicholson De Vos Webster & Elliott LLP

(57) ABSTRACT

An apparatus comprises a first tile comprising a first instance of a plurality of global endpoints and a first instance of a plurality of local networks comprising a plurality of local endpoints; and an interconnect network of the first tile to couple to an interconnect network of a second tile, the second tile comprising a second instance of the plurality of global endpoints and a second instance of the plurality of local networks comprising the plurality of local endpoints; wherein the interconnect network utilizes an address space comprising unique identifiers for the plurality of global endpoints of the first and second tiles; and non-unique identifiers for the plurality of local endpoints of the first and second tiles, wherein non-unique identifiers are reused in multiple local networks of the plurality of local networks of the first and second tiles.

19 Claims, 9 Drawing Sheets

|    | group:0 | group:1 |
|----|---------|---------|
| 00 | 0036: 0_0000_0000_0000_0010<br>0037: 0_0000_0000_0000_0010<br>0038: 0_0000_0000_0000_0010<br>0039: 0_0000_0000_0000_0010<br>0046: 0_0000_0000_0000_0001<br>0047: 0_0000_0000_0000_0010<br>0048: 0_0000_0000_0000_0010<br>0049: 0_0000_0000_0000_0010 | 0036: 0_0000_0000_0000_0001<br>0037: 0_0000_0000_0000_0100<br>0038: 0_0000_0000_0000_0100<br>0039: 0_0000_0000_0000_1000<br>0046: 0_0000_0000_0000_0010<br>0047: 0_0000_0000_0000_0100<br>0048: 0_0000_0000_0000_0100<br>0049: 0_0000_0000_0000_1000 |
| 01 | 0036: 0_0000_0000_0000_0010<br>0037: 0_0000_0000_0000_0010<br>0038: 0_0000_0000_0000_0010<br>0039: 0_0000_0000_0000_0010<br>0046: 0_0000_0000_0000_0010<br>0047: 0_0000_0000_0000_0001<br>0048: 0_0000_0000_0000_0010<br>0049: 0_0000_0000_0000_0010 | 0036: 0_0000_0000_0000_0100<br>0037: 0_0000_0000_0000_0001<br>0038: 0_0000_0000_0000_1000<br>0039: 0_0000_0000_0000_0100<br>0046: 0_0000_0000_0000_0100<br>0047: 0_0000_0000_0000_0010<br>0048: 0_0000_0000_0000_1000<br>0049: 0_0000_0000_0000_0100 |
| 10 | 0036: 0_0000_0000_0000_0010<br>0037: 0_0000_0000_0000_0010<br>0038: 0_0000_0000_0000_0010<br>0039: 0_0000_0000_0000_0010<br>0046: 0_0000_0000_0000_0010<br>0047: 0_0000_0000_0000_0010<br>0048: 0_0000_0000_0000_0001<br>0049: 0_0000_0000_0000_0010 | 0036: 0_0000_0000_0000_0100<br>0037: 0_0000_0000_0000_1000<br>0038: 0_0000_0000_0000_0001<br>0039: 0_0000_0000_0000_0100<br>0046: 0_0000_0000_0000_0100<br>0047: 0_0000_0000_0000_1000<br>0048: 0_0000_0000_0000_0010<br>0049: 0_0000_0000_0000_0100 |
| 11 | 0036: 0_0000_0000_0000_0010<br>0037: 0_0000_0000_0000_0010<br>0038: 0_0000_0000_0000_0010<br>0039: 0_0000_0000_0000_0010<br>0046: 0_0000_0000_0000_0010<br>0047: 0_0000_0000_0000_0010<br>0048: 0_0000_0000_0000_0010<br>0049: 0_0000_0000_0000_0001 | 0036: 0_0000_0000_0000_1000<br>0037: 0_0000_0000_0000_0100<br>0038: 0_0000_0000_0000_0100<br>0039: 0_0000_0000_0000_0001<br>0046: 0_0000_0000_0000_1000<br>0047: 0_0000_0000_0000_0100<br>0048: 0_0000_0000_0000_0100<br>0049: 0_0000_0000_0000_0010 |

FIG. 5

INTERCONNECT NETWORK FOR MULTI-TILE SYSTEM ON CHIPS

BACKGROUND

A system may comprise a may include any number of symmetrical tiles that include circuitry. A tile may comprise one or more semiconductor chips comprising circuitry. For example, a tile may implement a system on a chip (SoC). Each tile may comprise a number of endpoints. Endpoints may communicate with other endpoints to facilitate operation of the system.

BRIEF DESCRIPTION OF THE DRAWINGS

FIG. 5 illustrates routing tables for routers of the interconnect network of FIG. 4 in accordance with certain embodiments.

Like reference numbers and designations in the various drawings indicate like elements.

DETAILED DESCRIPTION

Figure 1:
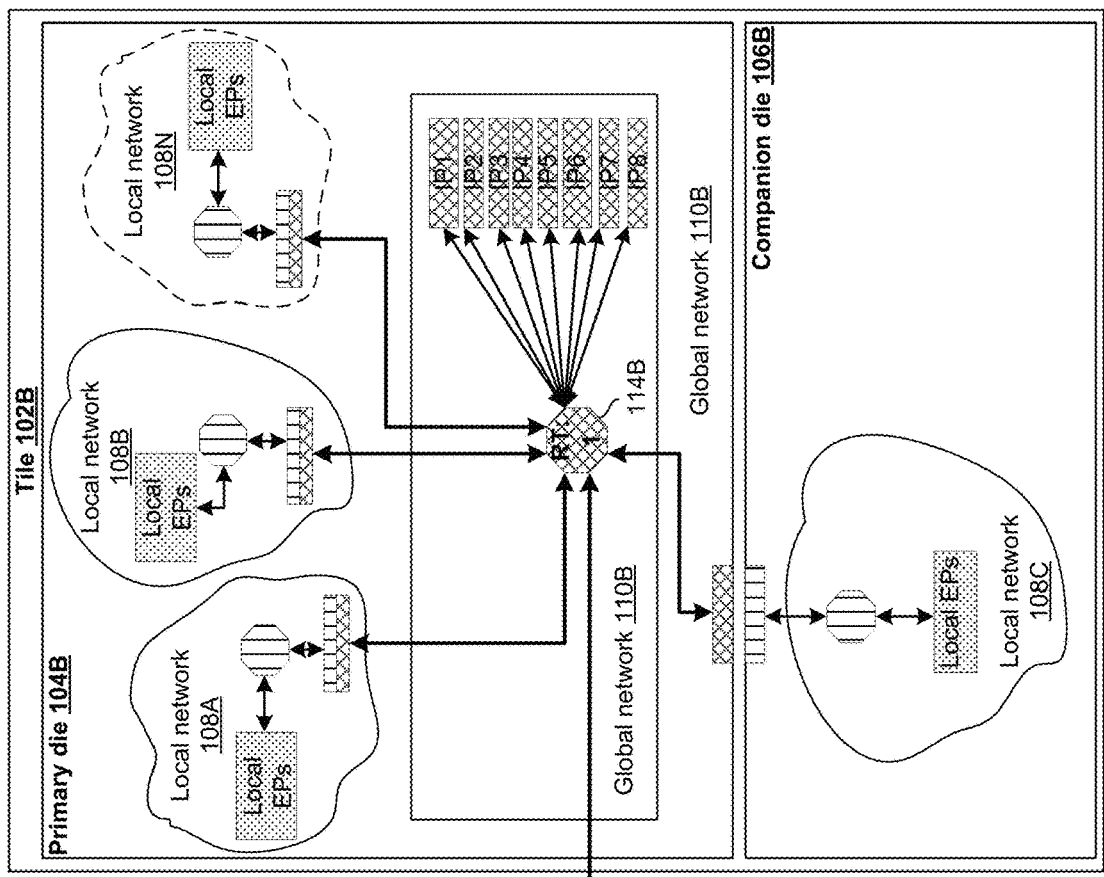
FIG. 1 illustrates an interconnect network for a multi-tile system in accordance with certain embodiments.
Figure 1:
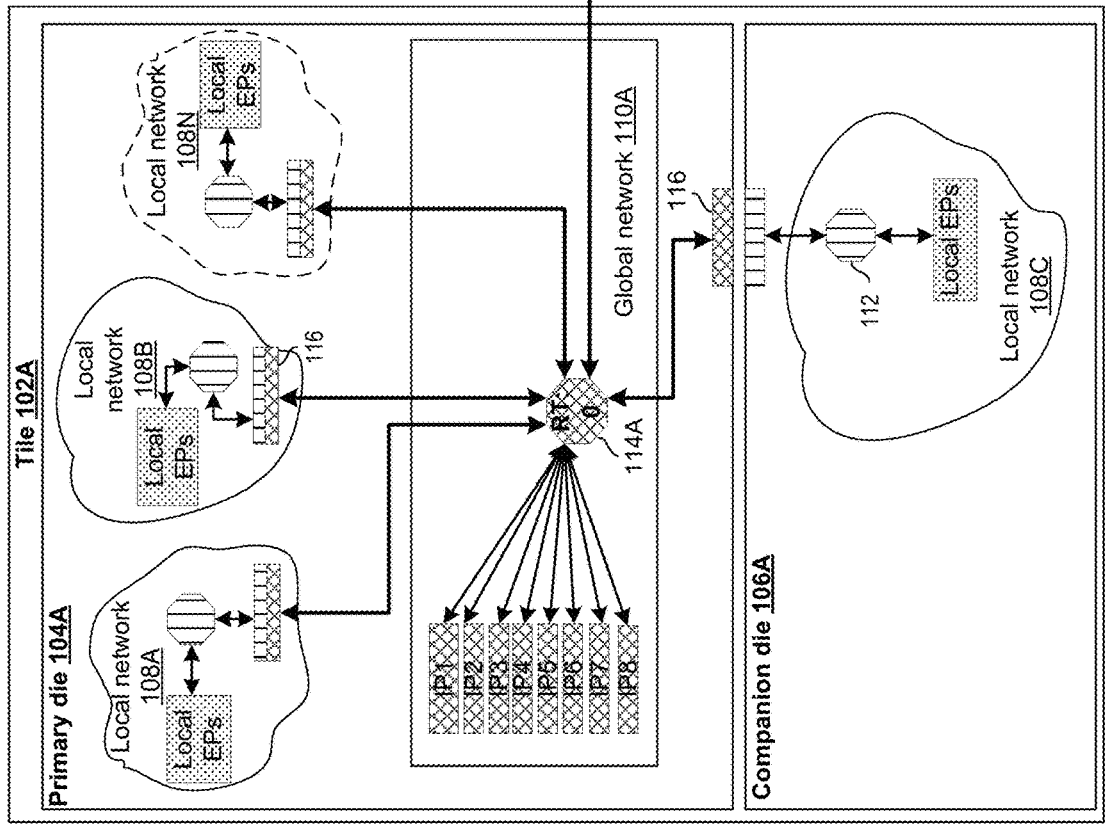

FIG. 1 illustrates an interconnect network for a multi-tile system 100 in accordance with certain embodiments. System 100 includes a first tile 102A and a second tile 102B. A tile may include any number of dies (e.g., semiconductor chips) and any suitable number of tiles may be included within system 100. In an embodiment, the tiles of the system 100 may be included in the same semiconductor package. In various embodiments, the circuitry of the tiles are symmetrical, such that at least a substantial majority of the circuitry included on one of the tiles is also included on each of the other tiles. Thus, the circuitry of the tiles may be identical or substantially identical (although circuitry may or may not be oriented differently on the tiles, e.g., to facilitate interconnections of circuitry of the tiles). In the embodiment depicted, each tile includes a respective primary die 104 and a companion die 106 (in other embodiments a tile 102 may include any number of companion dies coupled to the primary die 104 or no companion dies). In the embodiment depicted, a primary die 104 includes any number of local networks 108 (e.g., 108a-108n) and a global network 110 (e.g., 110A or 110B). Although the global networks do not expand to the companion dies 106 in the embodiment shown, in other embodiments the companion dies may also include a portion of a global network 110.

Scalability is a desirable quality for a communication network across multiple tiles. The network on each tile may be the same physical network (e.g., since the tiles are identical or substantially identical), but the networks may differ logically in order to facilitate cross-tile communication. Building a unique network across each tile may not be feasible due to cost or other constraints. Simply splitting the available network port identifiers between the various dies may run into scalability issues as the number of endpoints (EPs) and tiles increase. Cross-tile bridges with a preconfigured mapping (e.g., programmed by SoC firmware) may allow communication between a restricted set of EPs, but if a problem occurs on the package before the programming is completed, the network becomes unusable.

Various embodiments of the present disclosure provide a scalable communication network for multi-tile disaggregated SoCs. The network may include any number of local networks 108 (e.g., 108A, 108B, . . . 108N) coupling respective local EPs together as well as global networks 110 that collectively couple global EPs (e.g., intellectual property (IP) blocks illustrated in FIG. 1 as IP1-IP8) to other global EPs and to the local EPs of the local networks 108.

In various embodiments, the scalability is addressed by assigning, from a pool of EP identifiers, unique identifiers to each of the global EPs and then allowing reuse of remaining EP identifiers in the pool by the local networks to identify the local EPs. As an example, the pool of identifiers may be defined by an 8-bit address space, thus providing a pool of 256 identifiers. When X number of identifiers are used for a number (X) of global EPs, up to 256-X remaining identifiers may be used by the local networks 108 for the local EPs. For example, if 200 identifiers are allocated for the global EPs, each local network 108 may then use any (or all) of the remaining 56 identifiers (e.g., 0-55 if the higher values of the identifiers are used for the global EPs) for its local EPs. Accordingly, in this example, local network 108A may have up to 56 local EPs, local network 108B may also have up to 56 local EPs, and so on (as the identifiers may be reused in each local network 108). Thus, the identifiers for the local EPs may be reused within different local networks of the same tile and across multiple tiles 102.

In some embodiments, one or more identifiers of the address space may be reserved for multicast or broadcast communications within the local networks 108 (for example, a message having an identifier corresponding to a broadcast communication may be sent to all other local EPs within the same local network).

In order to allow communication between global EPs and local EPs, each local network 108 may be assigned a local network identifier, such that a global EP may use a local network identifier and a local EP identifier to reach a particular local EP. Messages passing from a local network 108 to a global network 110 may have the local network identifier appended to them and messages passing from a global network 110 to a local network 108 may have the local network identifier stripped (or ignored).

Various embodiments may include multi-routing table (RT) routers 114 (e.g., 114A, 114B) to configure a physical network on a tile (e.g., 102A) that is the same as the physical network on another tile (e.g., 102B) to function as a different logical network. The multi-RT routers may include multiple routing tables (e.g., one for each tile in the system 100 since each tile may include an identical multi-RT router), but only one routing table is used per router 114 to route traffic, where the routing table that is used by a particular router 114 is selected based on a parameter (e.g., an identifier of the tile 102 on which the respective router is located). Since the routing tables are statically built (e.g., the selected parameter value for each router may be designed into the circuitry of the RT routers 114), the network may be functional without requiring programming of the routers prior to operation (thus in some embodiments the routers do not need to provide firmware support).

Using the multi-RT routers 114 in conjunction with hierarchical networks facilitates coupling of one or more local networks 108 of companion dies 106 to the primary dies 104 and significantly reduces the number of multi-RT routers required in the network without adding significant area or power penalties. The categorization of the EPs into local and global pools may reduce the size of the routing network without unduly limiting the functionality of the chip.

In some embodiments, addresses (e.g., identifiers) for traffic within the local networks 108 may be shorter than addresses for traffic within the global network 110. For example, addresses within the local networks may be 8-bits long, while identifiers addresses within the global network 110 are 16-bits long, thus incurring a low routing cost while facilitating seamless communication across the tiles.

An EP (e.g., a global EP or a local EP) may comprise any suitable circuitry to source messages (e.g., packets) to or sink messages from a network (e.g., a local network 108 or a global network 110). A local network may include local EPs which may communicate with other EPs of the same local network and/or with any one or more of the global EPs, but may not communicate with local EPs of a different local network. A global EP may communicate with one or more other global EPs and/or with one or more local EPs of one or more local networks 108. As a few examples, a global EP could include a power management controller, a security controller, a fuse data distributor, or other logic that may communicate to one or more EPs of another tile or multiple different local networks 108.

Routing of messages (e.g., packets) within the network utilizes identifier (ID)-based routing. A message sent between EPs may include a header that includes routing information (e.g., a destination EP ID and a source EP ID). The header may include a global header and a local header. In one example, the global header may include the same portion (e.g., a most significant byte) of the source and destination IDs, while a local header may include another portion (e.g., the least significant byte) of the source and destination IDs. In various embodiments, messages communicated within a local network 108 only include the local header while messages communicated within a global network 110 include the full header (e.g., the local header and the global header). In one example, IDs used in the global network 110 may be 16-bit IDs, with the first byte used as the global header (e.g., to navigate the global network) and the second byte used as the local header (e.g., to navigate within a local network), while IDs used only in a local network 108 may be 8-bit IDs (e.g., a local header only).

When the local header is 8-bits long, the available address space to assign to EPs is a maximum of $2^8=256$ IDs. Each global EP ID (which identifies a global EP) may be a unique 8-bit ID in this address space. The global EP IDs are aliased into all the local networks 108, such that the global EP IDs are not allowed to be used to identify a local EP in the local networks, and thus the local address space (the address space left to assign to local EPs) is smaller than 256 IDs (e.g., the local address space will be the available address space minus the number of global EP IDs minus any other reserved addresses such as addresses used for multicast or broadcast). The local address space may then be used for local EP IDs which are only unique within each local network 108 (thus a local network 108 may reuse the same 8-bit local EP IDs used by another local network).

To illustrate, assuming that 128 local EP IDs are available, local networks 108A of the various tiles could each include local EPs with local EP IDs ranging from 0x00 to 0x7F, local networks 108B of the tiles could each include local EPs with local EP IDs ranging from 0x00 to 0x5A, and local networks 108N of the tiles could each include local EPs with local EP IDs ranging from 0x00 to 0x40. In this example, the local EP IDs 0x00 to 0x40 would each be used in each of the local networks 108A, 108B, and 108N, the local EP IDs 0x41 to 0x5A would each be used in each of the local networks 108A and 108B, and the local EP IDs 0x5B to 0x7F would each be used only in the local networks 108A. The number of local EPs used in this example is arbitrary and a system may be configured with any suitable number of local EPs in any suitable number of local networks 108.

Local EPs may communicate with other local EPs in the same local network 108 or with global EPs using only a local header, as the destination ID in the local header may uniquely identify a global EP or a local EP in the same local network 108. A global EP may communicate with other global EPs or with local EPs using both a global and local header, with the global header being used to Each local network 108 is assigned a local network ID in the global space (e.g., the address space defined by at least a portion of the global header). A local network ID may be included in a global header of a message generated by a global EP and may be used to send a message to a specific local network, while the local header may include a local EP ID (to reach a specific EP within the local network addressed by the global header). Since the global EP IDs are unique in the address space for the EPs, a local EP or a global EP may communicate with a global EP using the global EP ID (e.g., an 8-bit ID) in the local header.

Figure 2:
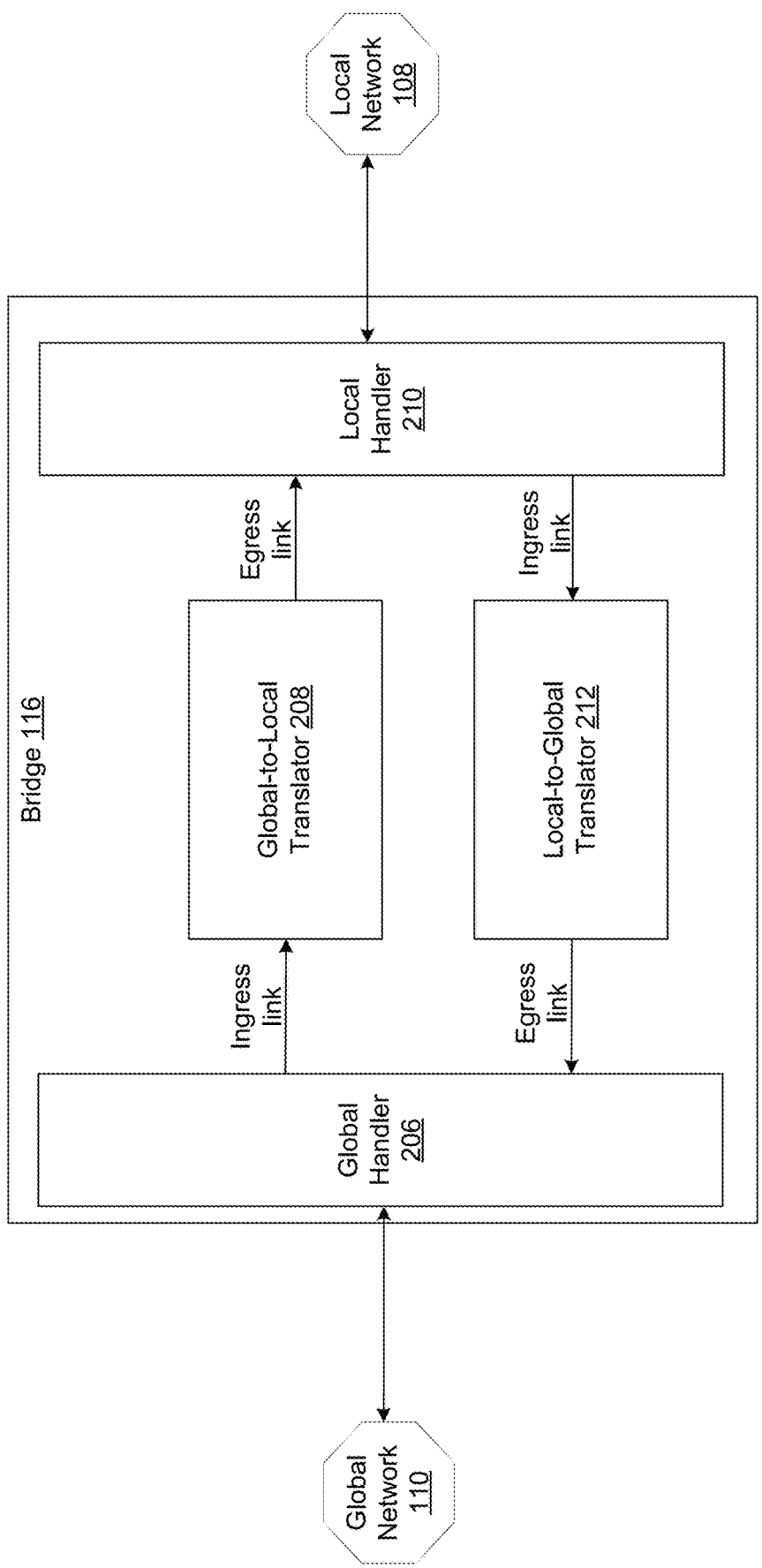
FIG. 2 illustrates a bridge of the interconnect network in accordance with certain embodiments.

FIG. 2 illustrates a bridge 116 of the interconnect network in accordance with certain embodiments. Referring jointly to FIG. 1 and FIG. 2, a bridge 116 may couple a local network 108 to a global network 110. A bridge 116 may strip the global header of a message when a message flows from a global network 110 to a local network 108 via the bridge. A bridge 116 may append a global header when a message flows from a local network 108 to a global network 110. The source ID in a global header that is appended by a bridge is the local network ID which is a fixed value and functions as a strap to the bridge 116 appending the global header. The destination ID of a global header that is appended by a bridge 116 may be a copy of the destination ID in the local header or other suitable value (e.g., all zeroes), as the global EP ID may be the same in the global address space and in the local address space.

In the embodiment depicted, bridge 116 includes a global handler 206 to interface with a global network 110 (e.g., via a router 114 of the global network 110) to receive messages from the global network and send outgoing messages to the global network. Bridge 116 also includes a local handler 210 to interface with a local network 108 (e.g., via a router 112 of the local network 108) to receive messages from the local network and send incoming messages to the local network. The bridge 116 also includes a global-to-local translator 208 to convert a message from a global network format to a local network format (e.g., by removing the global header from the message) and a local-to-global translator 212 to convert a message from a local network format to a global network format (e.g., by appending a global header to the message).

As various examples, when a local EP sends a message to another local EP of the same local network 108, the message may include a local header with a source ID of the local EP ID of the transmitting EP and a destination ID of the receiving local EP ID (and no global header is needed and thus may be omitted or included and ignored). When a local EP sends a message to a global EP, the message may include a local header with a source ID of the local EP ID of the transmitting EP and a destination ID of the receiving global EP ID (and no global header is needed and thus may be omitted or included and ignored). The message may later be modified by a bridge 116 to append the global header which includes a source ID of the local network 108 of the transmitting local EP and a destination ID that may be a copy of the global EP ID (or other suitable value). When a global IP sends a message to another global IP, the message may include a local header with a source ID of the global EP ID of the transmitting global EP and a destination ID of the receiving global EP ID as well as a global header including a source ID and destination ID that that is a copy of the source ID and destination ID of the local header (or other suitable values). Finally, when a global EP sends a message to a local EP, the message may include a local header with a source ID of the global EP ID of the transmitting global EP and a destination ID of the receiving local EP ID as well as a global header including a source ID that is a copy of the source ID of the local header (or other suitable value) and a destination ID that includes the local network ID of the receiving local EP.

Referring again to FIG. 1, the routers 114 (e.g., 114A and 114B) of the global network 110 may be multi-RT routers. A routing table may comprise a plurality of routing table entries, where a routing table entry may map a logical port ID (e.g., a global header portion of a destination ID or the full destination ID including both the global header portion and the local header portion) to a physical port of the router 114. A router may check a destination ID of an incoming message and the corresponding mapping for that ID to find the physical port of the router on which the message is to be sent. A multi-RT router 114 is a special router which has multiple routing tables, one for each instance (e.g., copy) of the router 114 in the system 100 (which could be equal to the number of tiles in the system), where only one of the routing tables is used by each router 114 to route traffic (e.g., based on a configured parameter). In some embodiments, each multi-RT router 114 may use a different one of the multiple routing tables. This allows each copy of an identical physical router to be configured as a different logical router. Thus, the routers 114 may be used in a multi-tile system to configure the same physical networks to behave as different logical networks.

Figure 3:
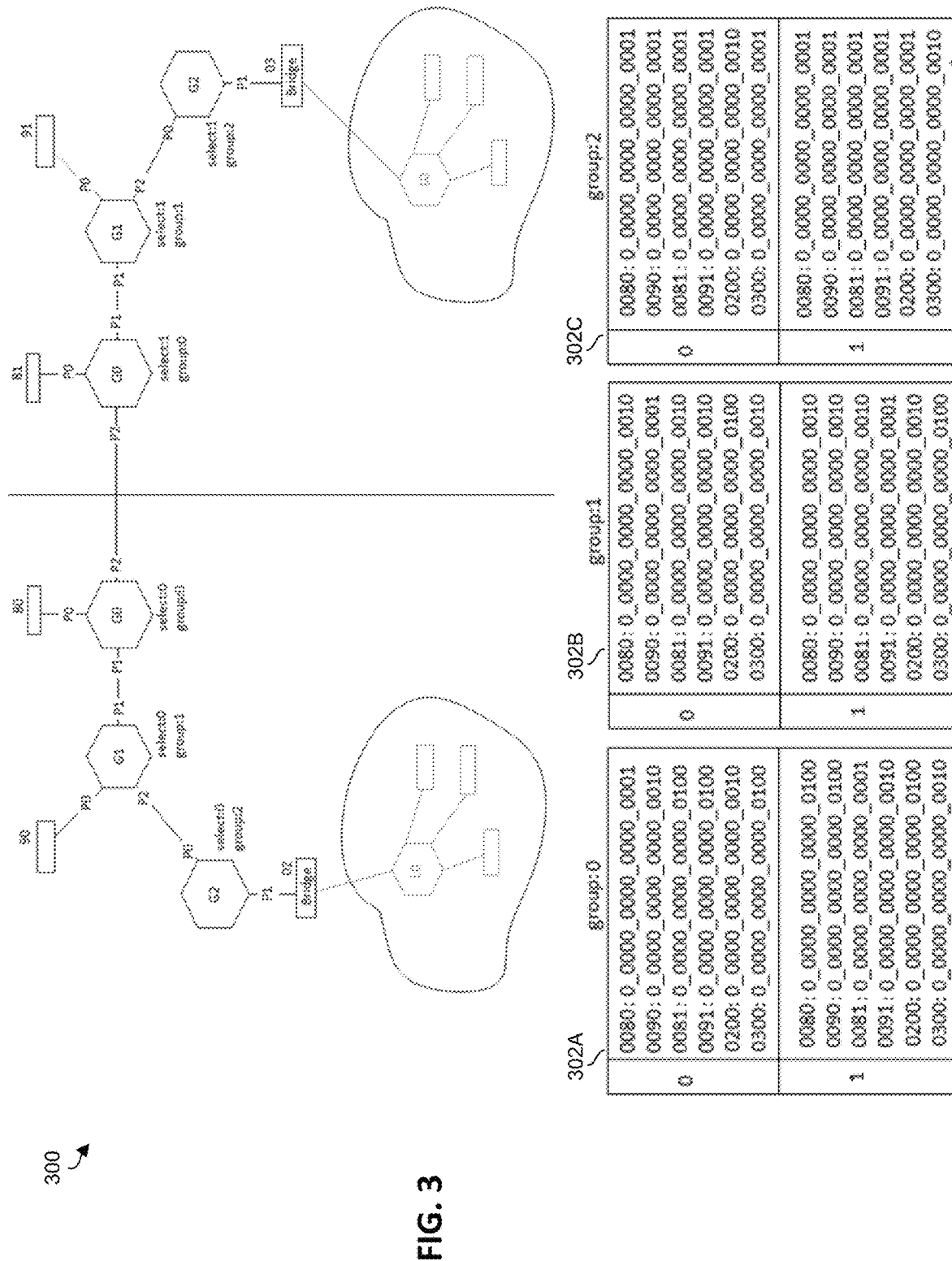
FIG. 3 illustrates an interconnect network for a two-tile system and corresponding routing tables in accordance with certain embodiments.

FIG. 3 illustrates an interconnect network for a two-tile system 300 and corresponding routing tables 302 in accordance with certain embodiments. The first tile is shown on the left and the second tile is shown on the right. In this example, there are two global EPs and one local network per tile. The global EPs have IDs that are unique across the tiles. Each tile comprises a global network comprising multi-RT routers G0, G1, and G2 as well as a local network comprising a local router L0 coupled to a plurality of local EPs. The first tile further comprises a first instance of a global EP (identified by global EP ID 80) and the second tile further comprises a second instance of that global EP (identified by global EP ID 81). The first tile includes a first instance of another global EP (identified by global EP ID 90) and the second tile includes a second instance of that global EP (identified by global EP ID 91). The first tile also includes a bridge with a local network ID of 02 coupled to the global network and the local network of the first tile. Similarly, the second tile includes a bridge with a local network ID of 03 coupled to the global network and local network of the second tile. The local networks are independent, and thus they are identified uniquely with a hierarchical ID in the global space (02 in the first tile and 03 in the second tile).

Each router in the global network of the first tile has a corresponding router (e.g., with identical or substantially identical circuitry) in the global network of the second tile and each pair is thus considered part of the same group. Thus, both G0 routers are part of group 0, both G1 routers are part of group 1, and both G2 routers are part of group 2. FIG. 3 also depicts routing tables 302 (e.g., 302A-302C) for the different multi-RT routers. The G0 routers each include routing tables 302A (which includes a first routing table selected for use when a configuration parameter has a value of 0 and a second routing table selected for use when the configuration parameter has a value of 1). Similarly, the G1 routers each include routing tables 302B and the G2 routers each include routing tables 302C. The particular configuration parameter used in this embodiment to select the routing table used by a particular router is simply a "select" parameter that corresponds to the tile on which the router is located. Thus, in the embodiment depicted, each router has a routing table select signal which is tied to a tile ID strap of the system which is 0 for the first tile and 1 for the second tile. Thus, all the routers in the first tile use their respective routing table 0 (the routing table on the top) and the routers in the second tile use routing table 1 (the routing table on the bottom).

Taking G0 of the first tile as an example, the router has three physical ports: P0, P1, and P2. Because the select value for G0 of the first tile is 0, the upper routing table of 302A is used. In the embodiment depicted, a one-hot routing scheme is used, where an assertion of bit 0 corresponds to P0, an assertion of bit 1 corresponds to P1, and an assertion of bit 2 corresponds to P2. When G0 receives a message with a destination ID of 0080 (where 0080 may be a hexadecimal representation of a 16-bit destination ID where 00 is the global header portion and 80 is the local header portion), the routing table entry for 0080 signifies that the message is to be passed through P0 towards the addressed global EP (with an ID in of 80 in the local address space). When G0 receives a message with 0090 as the destination ID, the message is to be passed through P1 to router G1 (towards the global EP with an ID of 90 in the local address space). When G0 receives a message with 0081 or 0091 as the destination ID, the message is to be passed through P2 to router G0 of the other tile (towards the global EP with an ID of 81 or the global EP with an ID of 91). When G0 of the first tile receives a message with a destination ID of 0200 (where the 02 of the global header indicates the message is to be routed to the local network of the first tile and the 00 of the local header indicates the message is to be routed to the local EP having an ID of 00), the message is routed through P1 towards the local network. When G0 receives a message with a destination ID of 0300 (where the 03 of the global header indicates the message is to be routed to the local network of the second tile and the 00 of the local header indicates the message is to be routed to the local EP having an ID of 00), the message is routed through P2 towards the local network of the second tile.

Based on the routing tables shown, each global EP can be uniquely identified and can reach any local EP within its tile or across tiles. Similarly, any local EP can reach any global EP within its tile or across tiles (although in some implementations the routing table may be limited to the mappings that are required by the particular system). Thus, the functionality of a full cross-tile hierarchical network is provided.

Although the routing tables are shown as operating on destination IDs having 16 bits (including both a global and local header portion), in some embodiments, the routing tables of the global routers may route messages based solely on the global header portion (e.g., when the IDs of the global EPs are copied into the global header portion).

Figure 4:
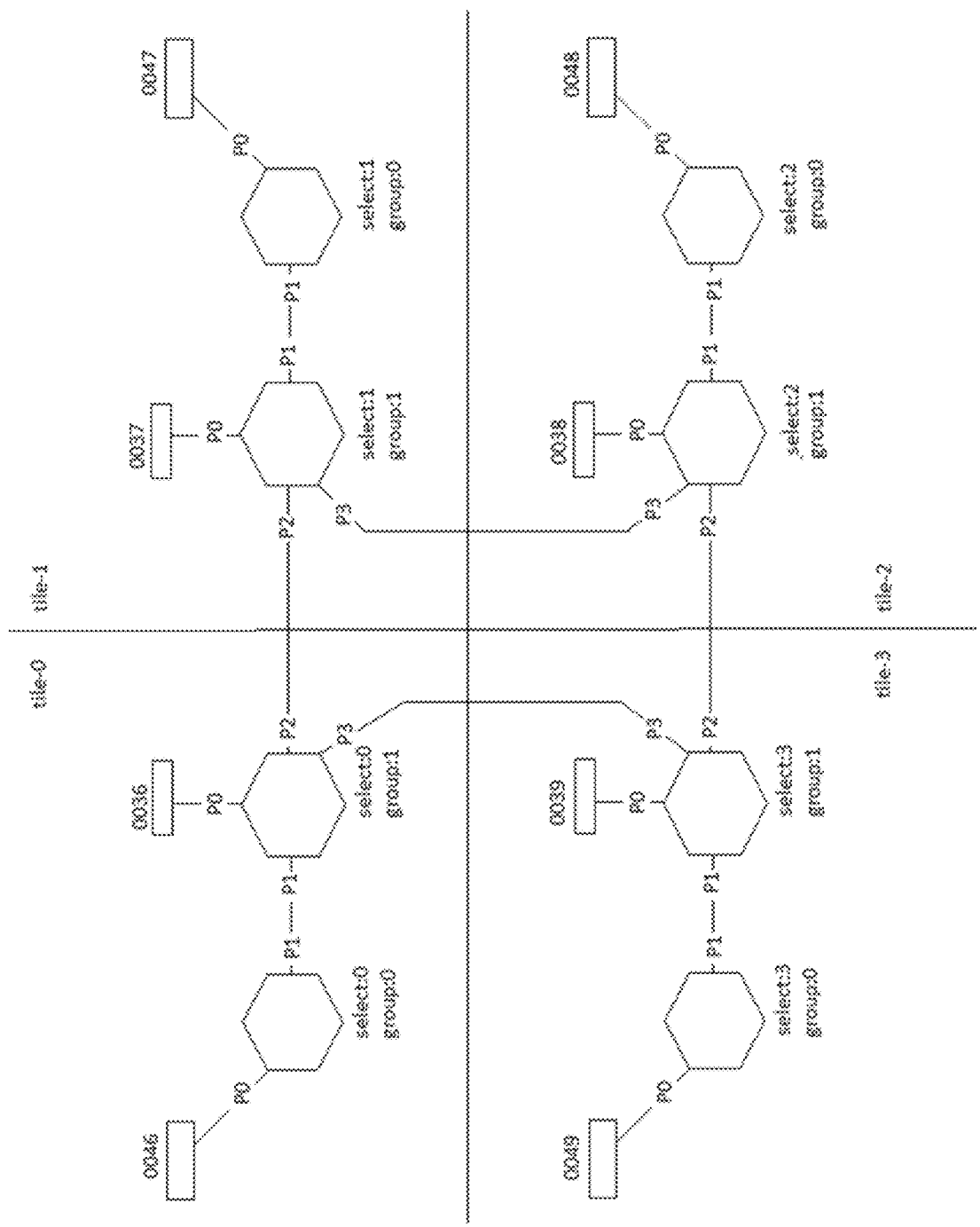
FIG. 4 illustrates an interconnect network for a four-tile system in accordance with certain embodiments.

FIG. 4 illustrates an interconnect network 400 for a four-tile system in accordance with certain embodiments. FIG. 5 illustrates routing tables for the routers of network 400, where each "group:0" router includes the routing tables in the "group:0" column and each "group:1" router includes the routing tables in the "group:1" column. In this particular example, no local networks are shown. The routing tables may have any suitable characteristics as those described above with respect to FIG. 3, and the actual routing table used by a particular router is controlled by the value of the "select" signal.

Figure 6:
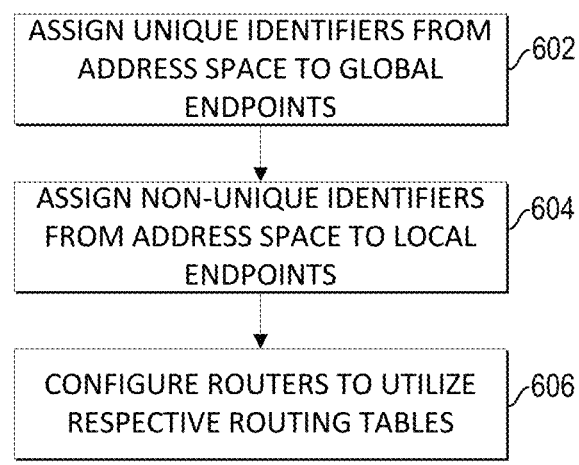
FIG. 6 illustrates a flow for configuring a multi-tile system in accordance with certain embodiments.

FIG. 6 illustrates a flow for configuring the interconnect network of FIG. 1 in accordance with certain embodiments. At 602, unique identifiers from an address space (e.g., a local address space) are assigned to global endpoints of the tiles of a multi-tile system. At 604, non-unique identifiers from the address space are assigned to local endpoints of local networks of the tiles. At 606, a plurality of multi-RT routers of the interconnect network are each configured to use a respective routing table (e.g., based on which tile the multi-RT router is on). In various embodiments, the various configuration operations of the flow may be performed during a design phase of the system, such that fabrication of the tiles will result in the configurations being put into effect (e.g., without requiring loading of firmware).

Figure 7:
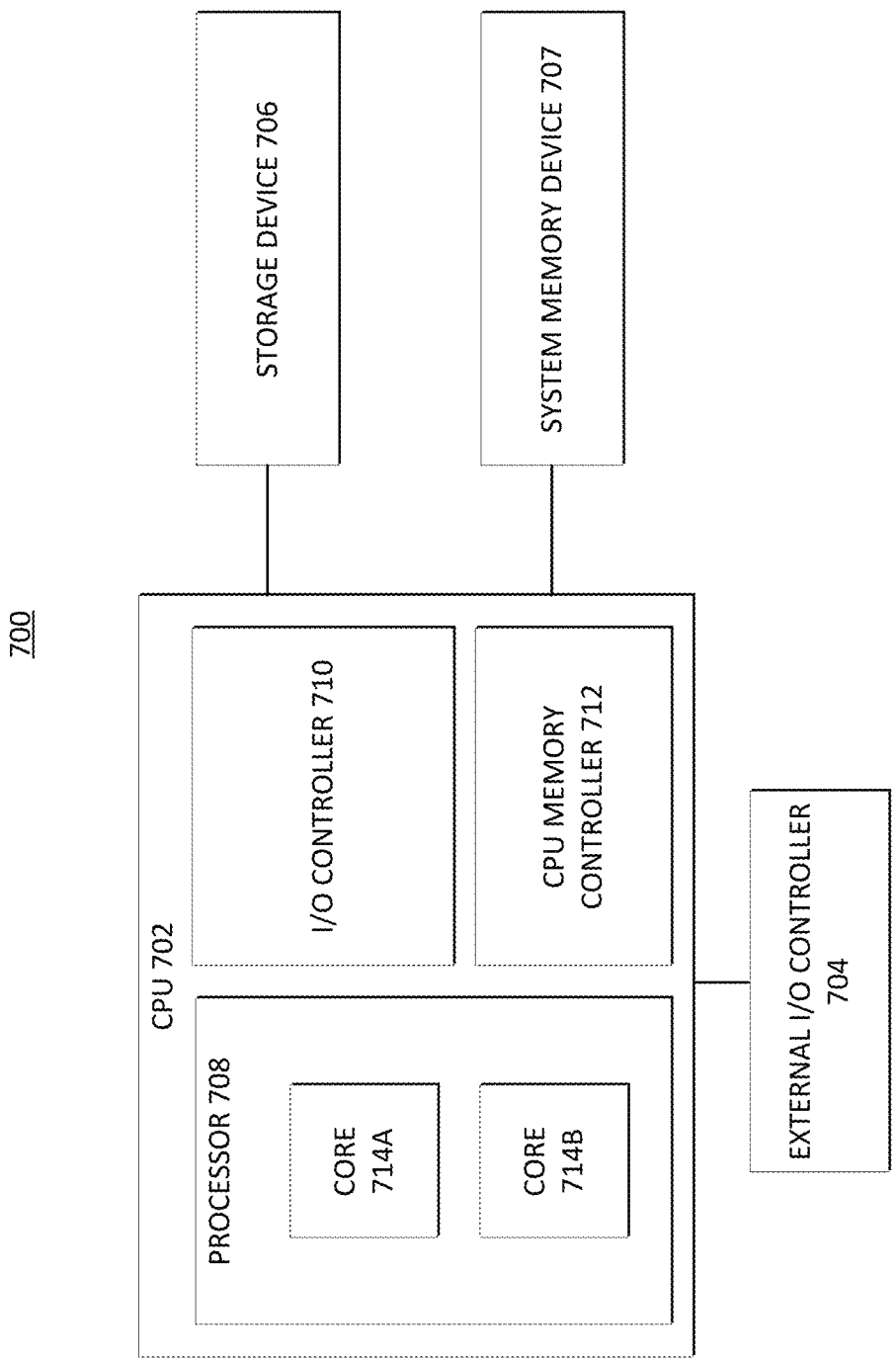
FIG. 7 illustrates an example computer system in accordance with certain embodiments.
Figure 8:
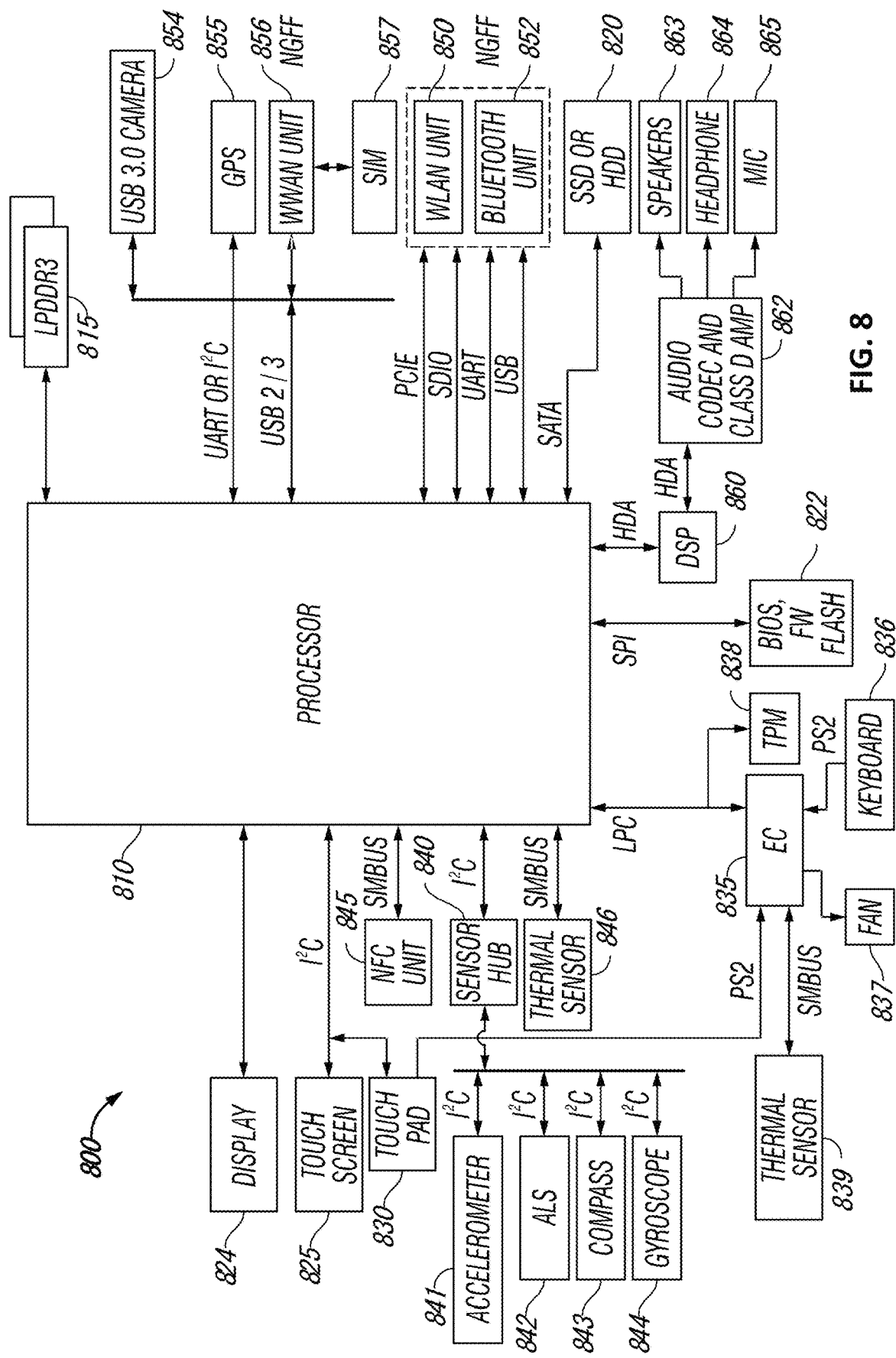
FIG. 8 illustrates a block diagram of components present in a computing system in accordance with various embodiments.
Figure 9:
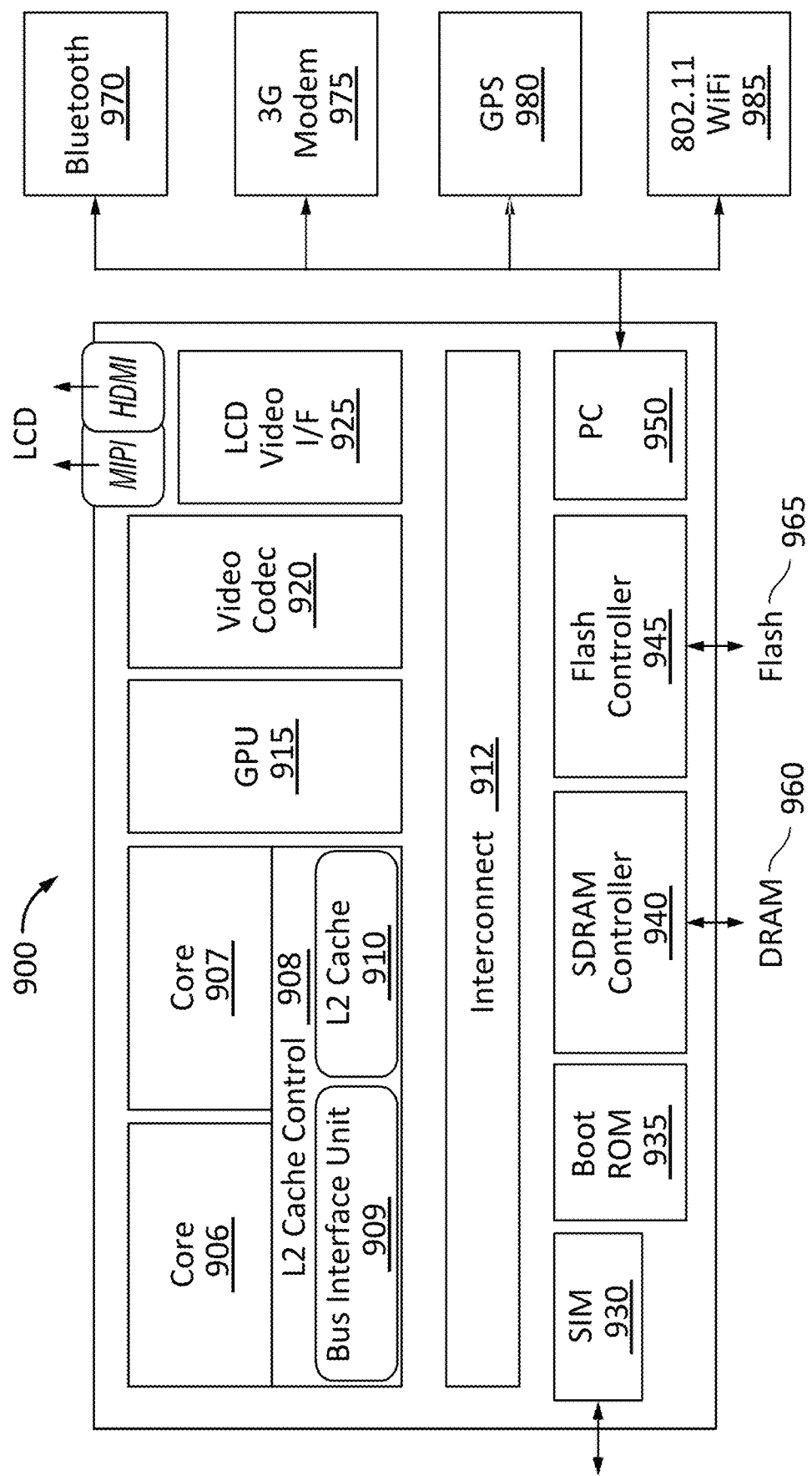
FIG. 9 illustrates a block diagram of another computing system in accordance with various embodiments.

FIGS. 7-9 depict example systems in which various embodiments described herein may be implemented. For example, any of the systems depicted (or one or more components thereof) may be implemented by system 100. As another example, a tile 102 or a die of a tile may correspond to or comprise CPU 702, processor 810, or SOC 900. As yet another example, one or more of the components of FIGS. 7-9 may be or include a local or global EP.

FIG. 7 illustrates components of a computer system 700 in accordance with certain embodiments. System 700 includes a central processing unit (CPU) 702 coupled to an external input/output (I/O) controller 704, a storage device 706 such as a solid state drive (SSD) or a dual inline memory module (DIMM), and system memory device 707. During operation, data may be transferred between a storage device 706 and/or system memory device 707 and the CPU 702. In various embodiments, particular memory access operations (e.g., read and write operations) involving a storage device 706 or system memory device 707 may be issued by an operating system and/or other software applications executed by processor 708.

CPU 702 comprises a processor 708, such as a microprocessor, an embedded processor, a digital signal processor (DSP), a network processor, a handheld processor, an application processor, a co-processor, an SOC, or other device to execute code (e.g., software instructions). Processor 708, in the depicted embodiment, includes two processing elements (cores 714A and 714B in the depicted embodiment), which may include asymmetric processing elements or symmetric processing elements. However, a processor may include any number of processing elements that may be symmetric or asymmetric. CPU 702 may be referred to herein as a host computing device (though a host computing device may be any suitable computing device operable to issue memory access commands to a storage device 706).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 714 (e.g., 714A or 714B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

In some embodiments, processor 708 may comprise a processor unit, such as a processor core, graphics processing unit, hardware accelerator, field programmable gate array, neural network processing unit, artificial intelligence processing unit, inference engine, data processing unit, or infrastructure processing unit.

I/O controller 710 is an integrated I/O controller that includes logic for communicating data between CPU 702 and I/O devices. In other embodiments, the I/O controller 710 may be on a different chip from the CPU 702. I/O devices may refer to any suitable devices capable of transferring data to and/or receiving data from an electronic system, such as CPU 702. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 706 coupled to the CPU 702 through I/O controller 710.

An I/O device may communicate with the I/O controller 710 of the CPU 702 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 710 and an associated I/O device may communicate data and commands in accordance with a logical device interface specification such as Non-Volatile Memory Express (NVMe)

(e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 710 may be located off-chip (e.g., not on the same chip as CPU 702) or may be integrated on the same chip as the CPU 702.

CPU memory controller 712 is an integrated memory controller that controls the flow of data going to and from one or more system memory devices 707. CPU memory controller 712 may include logic operable to read from a system memory device 707, write to a system memory device 707, or to request other operations from a system memory device 707. In various embodiments, CPU memory controller 712 may receive write requests from cores 714 and/or I/O controller 710 and may provide data specified in these requests to a system memory device 707 for storage therein. CPU memory controller 712 may also read data from a system memory device 707 and provide the read data to I/O controller 710 or a core 714. During operation, CPU memory controller 712 may issue commands including one or more addresses of the system memory device 707 in order to read data from or write data to memory (or to perform other operations). In some embodiments, CPU memory controller 712 may be implemented on the same chip as CPU 702, whereas in other embodiments, CPU memory controller 712 may be implemented on a different chip than that of CPU 702. I/O controller 710 may perform similar operations with respect to one or more storage devices 706.

The CPU 702 may also be coupled to one or more other I/O devices through external I/O controller 704. In a particular embodiment, external I/O controller 704 may couple a storage device 706 to the CPU 702. External I/O controller 704 may include logic to manage the flow of data between one or more CPUs 702 and I/O devices. In particular embodiments, external I/O controller 704 is located on a motherboard along with the CPU 702. The external I/O controller 704 may exchange information with components of CPU 702 using point-to-point or other interfaces.

A system memory device 707 may store any suitable data, such as data used by processor 708 to provide the functionality of computer system 700. For example, data associated with programs that are executed or files accessed by cores 714 may be stored in system memory device 707. Thus, a system memory device 707 may include a system memory that stores data and/or sequences of instructions that are executed or otherwise used by the cores 714. In various embodiments, a system memory device 707 may store temporary data, persistent data (e.g., a user's files or instruction sequences) that maintains its state even after power to the system memory device 707 is removed, or a combination thereof. A system memory device 707 may be dedicated to a particular CPU 702 or shared with other devices (e.g., one or more other processors or other devices) of computer system 700.

In various embodiments, a system memory device 707 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 706 may store any suitable data, such as data used by processor 708 to provide functionality of computer system 700. For example, data associated with programs that are executed or files accessed by cores 714A and 714B may be stored in storage device 706. Thus, in some embodiments, a storage device 706 may store data and/or sequences of instructions that are executed or otherwise used by the cores 714A and 714B. In various embodiments, a storage device 706 may store persistent data (e.g., a user's files or software application code) that maintains its state even after power to the storage device 706 is removed. A storage device 706 may be dedicated to CPU 702 or shared with other devices (e.g., another CPU or other device) of computer system 700.

In various embodiments, storage device 706 may comprise a disk drive (e.g., a solid state drive); a memory card;

a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, a semiconductor chip may be embodied in a semiconductor package. In various embodiments, a semiconductor package may comprise a casing comprising one or more semiconductor chips (also referred to as dies). A package may also comprise contact pins or leads used to connect to external circuits.

In some embodiments, all or some of the elements of system 700 are resident on (or coupled to) the same circuit board (e.g., a motherboard). In various embodiments, any suitable partitioning between the elements may exist. For example, the elements depicted in CPU 702 may be located on a single die (e.g., on-chip) or package or any of the elements of CPU 702 may be located off-chip or off-package. Similarly, the elements depicted in storage device 706 may be located on a single chip or on multiple chips. In various embodiments, a storage device 706 and a computing host (e.g., CPU 702) may be located on the same circuit board or on the same device and in other embodiments the storage device 706 and the computing host may be located on different circuit boards or devices.

The components of system 700 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 700, such as cores 714, one or more CPU memory controllers 712, I/O controller 710, integrated I/O devices, direct memory access (DMA) logic (not shown), etc. In various embodiments, components of computer system 700 may be coupled together through one or more networks comprising any number of intervening network nodes, such as routers, switches, or other computing devices. For example, a computing host (e.g., CPU 702) and the storage device 706 may be communicably coupled through a network.

Although not depicted, system 700 may use a battery and/or power supply outlet connector and associated system to receive power, a display to output data provided by CPU 702, or a network interface allowing the CPU 702 to communicate over a network. In various embodiments, the battery, power supply outlet connector, display, and/or network interface may be communicatively coupled to CPU 702. Other sources of power can be used such as renewable energy (e.g., solar power or motion based power).

Referring now to FIG. 8, a block diagram of components present in a computer system that may function as either a host device or a peripheral device (or which may include both a host device and one or more peripheral devices) in accordance with certain embodiments is described. As shown in FIG. 8, system 800 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 8, a processor 810, in one embodiment, includes a microprocessor, multi-core processor, multi-threaded processor, an ultra-low voltage processor, an embedded processor, or other known processing element. In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, CA. However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I2C interconnect. As further shown in FIG. 8, in addition to touch screen 825, user input by way of touch can also occur via a touch pad 830 which may be configured within the chassis and may also be coupled to the same I2C interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I2C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 8, various peripheral devices may couple to processor 810. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 9, another block diagram for an example computing system that may serve as a host device or peripheral device (or may include both a host device and one or more peripheral devices) in accordance with certain embodiments is shown. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 900 includes 2 cores—906 and 907. Similar to the discussion above, cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 912 includes an on-chip interconnect, such as an IOSF, AMBA, or other interconnect discussed above, which potentially implements one or more aspects of the described disclosure.

Interconnect 912 provides communication channels to the other components, such as a Subscriber Identity Module (SIM) 930 to interface with a SIM card, a boot rom 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein.

In addition, the system illustrates peripherals for communication, such as a Bluetooth module 970, 3G modem 975, GPS 980, and WiFi 985. Note as stated above, a UE includes a radio for communication. As a result, these peripheral communication modules are not all required. However, in a UE some form of a radio for external communication is to be included.

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of the FIGs., subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a system comprising a first tile comprising a first instance of a plurality of global endpoints and a first instance of a plurality of local networks comprising a plurality of local endpoints; a second tile comprising a second instance of the plurality of global endpoints and a second instance of the plurality of local networks comprising the plurality of local endpoints; and an interconnect network of the first tile and second tile, wherein the interconnect network utilizes an address space comprising unique identifiers for the plurality of global endpoints of the first and second tiles; and non-unique identifiers for the plurality of local endpoints of the first and second tiles, wherein non-unique identifiers are reused in multiple local networks of the plurality of local networks of the first and second tiles.

Example 2 includes the subject matter of Example 1, and wherein the interconnect network comprises a global network of the first tile, the global network coupling global endpoints of the plurality of global endpoints to local networks of the plurality of local networks of the first tile.

Example 3 includes the subject matter of any of Examples 1 and 2, and wherein the interconnect network comprises a bridge coupled to the global network and a first local network of the plurality of local networks, wherein the bridge appends an identifier of the first local network to messages sent from the first local network to the global network.

Example 4 includes the subject matter of any of Examples 1-3, and wherein the interconnect network comprises a bridge coupled to the global network and a first local network of the plurality of local networks, wherein the bridge deletes an identifier of the first local network from messages sent from the global network to the local network.

Example 5 includes the subject matter of any of Examples 1-4, and wherein the global network comprises a first global router that comprises a plurality of routing tables, the system further comprising a second global network of the second tile, the second global network comprising a second global router that comprises the same plurality of routing tables.

Example 6 includes the subject matter of any of Examples 1-5, and wherein a configuration parameter is to select a first routing table of the plurality of routing tables of the first global router for use by the first global router.

Example 7 includes the subject matter of any of Examples 1-6, and wherein a first message communicated within a local network of the plurality of local networks is routed based on an address of a local header of the first message, and wherein a second message communicated within the global network is routed based on an address of a global header of the second message.

Example 8 includes the subject matter of any of Examples 1-7, and wherein a local endpoint of the plurality of local endpoints is to communicate with at least one other local endpoint of the same local network and with at least one of the global endpoints, but is not to communicate with any local endpoints of the other local networks.

Example 9 includes the subject matter of any of Examples 1-8, and wherein a global endpoint of the plurality of global endpoints is to communicate with at least one of the global endpoints and at least one local endpoint of a plurality of different local networks.

Example 10 includes the subject matter of any of Examples 1-9, and further including at least one additional tile each comprising an additional instance of the plurality of global endpoints and an additional instance of the plurality of local networks comprising the plurality of local endpoints.

Example 11 includes the subject matter of any of Examples 1-10, and wherein the first tile comprises a processor.

Example 12 includes the subject matter of any of Examples 1-11, and further including a battery communicatively coupled to the processor, a display communicatively coupled to the processor, or a network interface communicatively coupled to the processor.

Example 13 includes the subject matter of any of Examples 1-12, and further comprising a semiconductor package comprising the first tile and the second tile.

Example 14 includes an apparatus comprising a first tile comprising a first instance of a plurality of global endpoints and a first instance of a plurality of local networks comprising a plurality of local endpoints; and an interconnect network of the first tile to couple to an interconnect network of a second tile, the second tile comprising a second instance of the plurality of global endpoints and a second instance of the plurality of local networks comprising the plurality of local endpoints; wherein the interconnect network utilizes an address space comprising unique identifiers for the plurality of global endpoints of the first and second tiles; and non-unique identifiers for the plurality of local endpoints of the first and second tiles, wherein non-unique identifiers are reused in multiple local networks of the plurality of local networks of the first and second tiles.

Example 15 includes the subject matter of Example 14, and wherein the interconnect network comprises a bridge to receive a message from a first local endpoint of a first local network of the plurality of local networks and append an identifier of the first local network to the message before sending the message towards a first global endpoint of the plurality of global endpoints.

Example 16 includes the subject matter of any of Examples 14 and 15, and wherein the interconnect network comprises a bridge to receive a message from a first global endpoint of the plurality of global endpoints and delete an identifier of a first local network from the message before sending the message towards a first local endpoint of the first local network.

Example 17 includes the subject matter of any of Examples 14-16, and wherein a local endpoint of the plurality of local endpoints is to communicate with at least one other local endpoint of the same local network and with at least one of the global endpoints, but not to communicate with any local endpoints of the other local networks.

Example 18 includes the subject matter of any of Examples 14-17, and wherein the interconnect network of the first tile comprises a global network of the first tile, the global network coupling global endpoints of the plurality of global endpoints to local networks of the plurality of local networks of the first tile.

Example 19 includes the subject matter of any of Examples 14-18, and wherein the global network of the first tile comprises a first global router that comprises a plurality of routing tables, wherein the second tile comprises a second global network, the second global network comprising a second global router that comprises the same plurality of routing tables.

Example 20 includes the subject matter of any of Examples 14-19, and wherein a configuration parameter is to select a first routing table of the plurality of routing tables of the first global router for use by the first global router.

Example 21 includes the subject matter of any of Examples 14-20, and wherein a first message communicated within a local network of the plurality of local networks is routed based on an address of a local header of the first message, and wherein a second message communicated within the global network is routed based on an address of a global header of the second message.

Example 22 includes the subject matter of any of Examples 14-21, and wherein a global endpoint of the plurality of global endpoints is to communicate with at least one of the global endpoints and at least one local endpoint of a plurality of different local networks.

Example 23 includes the subject matter of any of Examples 14-22, and further including at least one additional tile each comprising an additional instance of the plurality of global endpoints and an additional instance of the plurality of local networks comprising the plurality of local endpoints.

Example 24 includes the subject matter of any of Examples 14-23, and wherein the first tile comprises a processor.

Example 25 includes the subject matter of any of Examples 14-24, and further including a battery communicatively coupled to the processor, a display communicatively coupled to the processor, or a network interface communicatively coupled to the processor.

Example 25 includes the subject matter of any of Examples 14-25, the apparatus further comprising a semiconductor package comprising the first tile and the second tile.

Example 27 includes a method comprising assigning unique identifiers from an address space of an interconnect network to a plurality of global endpoints of first and second tiles, wherein the first tile comprises a first instance of the plurality of global endpoints and a first instance of a plurality of local networks comprising a plurality of local endpoints, wherein the second tile comprises a second instance of the plurality of global endpoints and a second instance of the plurality of local networks comprising the plurality of local endpoints; and assigning non-unique identifiers from the address space of the interconnect network to the plurality of local endpoints, wherein non-unique identifiers are reused in multiple local networks of the plurality of local networks of the first and second tiles.

Example 28 includes the subject matter of Example 27, and further including configuring a router of the first tile to utilize a first routing table, wherein the router of the first tile comprises a plurality of routing tables.

Example 29 includes the subject matter of any of Examples 27 and 28, and further including configuring a router of the second tile to utilize a second routing table, wherein the router of the second tile comprises the plurality of routing tables.

What is claimed is:
1. A system comprising:
 a first tile comprising a first instance of a plurality of global endpoints and first instance of a plurality of local networks comprising a plurality of local endpoints;

a second tile comprising a second instance of the plurality of global endpoints and a second instance of the plurality of local networks comprising the plurality of local endpoints; and an interconnect network of the first tile and second tile, wherein the interconnect network is to use an address space comprising:

unique identifiers for the plurality of global endpoints of the first and second tiles; and non-unique identifiers for the plurality of local endpoints of the first and second tiles, wherein non-unique identifiers are reused in multiple local networks of the plurality of local networks of the first and second tiles, and wherein the interconnect network comprises a global network of the first tile, the global network coupling global endpoints of the plurality of global endpoints to local networks of the plurality of local networks of the first tile.

2. The system of claim 1, wherein the interconnect network comprises a bridge coupled to the global network and a first local network of the plurality of local networks, wherein the bridge is capable of appending an identifier of the first local network to messages sent from the first local network to the global network.

3. The system of claim 1, wherein the interconnect network comprises a bridge coupled to the global network and a first local network of the plurality of local networks, wherein the bridge is capable of deleting an identifier of the first local network from messages sent from the global network to the first local network.

4. The system of claim 1, wherein the global network comprises a first global router that comprises a plurality of routing tables, the system further comprising a second global network of the second tile, the second global network comprising a second global router that comprises the same plurality of routing tables.

5. The system of claim 4, wherein a first routing table of the plurality of routing tables of the first global router is capable of being selected according to a configuration parameter for use by the first global router.

6. The system of claim 1, wherein a first message communicated within a local network of the plurality of local networks is to be routed based on an address of a local header of the first message, and wherein a second message communicated within the global network is to be routed based on an address of a global header of the second message.

7. The system of claim 1, wherein a local endpoint of the plurality of local endpoints is to communicate with at least one other local endpoint of the same local network and with at least one of the global endpoints, but is not to communicate with any local endpoints of the other local networks.

8. The system of claim 1, wherein a global endpoint of the plurality of global endpoints is to communicate with at least one of the global endpoints and at least one local endpoint of a plurality of different local networks.

9. The system of claim 1, further comprising at least one additional tile each comprising an additional instance of the plurality of global endpoints and an additional instance of the plurality of local networks comprising the plurality of local endpoints.

10. The system of claim 1, wherein the first tile comprises a processor.

11. The system of claim 10, further comprising a battery communicatively coupled to the processor, a display communicatively coupled to the processor, or a network interface communicatively coupled to the processor.

12. The system of claim 1, the system further comprising a semiconductor package comprising the first tile and the second tile.

13. An apparatus comprising:

a first tile comprising a first instance of a plurality of global endpoints and a first instance of a plurality of local networks comprising a plurality of local endpoints; and an interconnect network of the first tile to couple to an interconnect network of a second tile, the second tile comprising a second instance of the plurality of global endpoints and a second instance of the plurality of local networks comprising the plurality of local endpoints;

wherein the interconnect network is configured to use an address space comprising:

unique identifiers for the plurality of global endpoints of the first and second tiles; and non-unique identifiers for the plurality of local endpoints of the first and second tiles, wherein non-unique identifiers are reused in multiple local networks of the plurality of local networks of the first and second tiles, and wherein the interconnect network comprises a bridge to receive a message from a first global endpoint of the plurality of global endpoints and to delete an identifier of a first local network from the message before sending the message towards a first local endpoint of the first local network.

14. The apparatus of claim 13, wherein the interconnect network comprises a bridge to receive a message from a first local endpoint of a first local network of the plurality of local networks and append an identifier of the first local network to the message before sending the message towards a first global endpoint of the plurality of global endpoints.

15. The apparatus of claim 13, wherein a local endpoint of the plurality of local endpoints is to communicate with at least one other local endpoint of the same local network and with at least one of the global endpoints, but not to communicate with any local endpoints of the other local networks.

16. A method comprising:

assigning unique identifiers from an address space of an interconnect network to a plurality of global endpoints of first and second tiles, wherein the first tile comprises a first instance of the plurality of global endpoints and a first instance of a plurality of local networks comprising a plurality of local endpoints, wherein the interconnect network comprises a global network of the first tile, the global network coupling global endpoints of the plurality of global endpoints to local networks of the plurality of local networks of the first tile, and wherein the second tile comprises a second instance of the plurality of global endpoints and a second instance of the plurality of local networks comprising the plurality of local endpoints; and assigning non-unique identifiers from the address space of the interconnect network to the plurality of local endpoints, wherein non-unique identifiers are reused in multiple local networks of the plurality of local networks of the first and second tiles.

17. The method of claim 16, further comprising configuring a router of the first tile to utilize a first routing table, wherein the router of the first tile comprises a plurality of routing tables.

18. The method of claim 17, further comprising configuring a router of the second tile to utilize a second routing table, wherein the router of the second tile comprises the plurality of routing tables.

19. The method of claim 16 wherein the first tile and the second tile are co-located in a semiconductor package.

* * * * *